United States Patent [19]

Loup et al.

[11] Patent Number: 5,967,890
[45] Date of Patent: Oct. 19, 1999

[54] HEATING AND VENTILATING APPARATUS FOR THE CABIN OF A MOTOR VEHICLE

[75] Inventors: Didier Loup, Maurepas; Sophie Casado, Buc, both of France

[73] Assignee: Valeo Climatisation, La Verriere, France

[21] Appl. No.: 08/873,355

[22] Filed: Jun. 12, 1997

[30] Foreign Application Priority Data

Jun. 14, 1996 [FR] France .................................. 96 07455

[51] Int. Cl.$^6$ .................................................. B60H 1/06
[52] U.S. Cl. .......................................... 454/121; 454/126
[58] Field of Search .................................. 454/121, 126, 454/156, 160

[56] References Cited

U.S. PATENT DOCUMENTS 4,406,214  9/1983  Sakurai ..................................... 454/126
5,109,755  5/1992  Guillemis ................................. 454/160

FOREIGN PATENT DOCUMENTS 1 573 588   7/1969   France .
34 22 182  12/1984   Germany ................................ 454/160
38 26 182  10/1989   Germany ................................ 454/160
40 22 932   1/1991   Germany .
195 15 836 11/1995   Germany .
1 227 334   4/1971   United Kingdom .

OTHER PUBLICATIONS

French Search Report dated Mar. 7 1997.

Primary Examiner—Harold Joyce
Attorney, Agent, or Firm—Morgan & Finnegan, L.L.P.

[57] ABSTRACT

The apparatus includes a casing, in which a fresh air passage member has an inlet port communicating with a fresh air inlet, and an outlet port open into an outlet chamber, which is fed through a mixing zone and which in its turn supplies a ventilating duct and a heating duct, the passage member containing internal deflecting walls for encouraging mixing of a stream of fresh air with a stream of mixed air at the outlet of the said passage member.

23 Claims, 3 Drawing Sheets

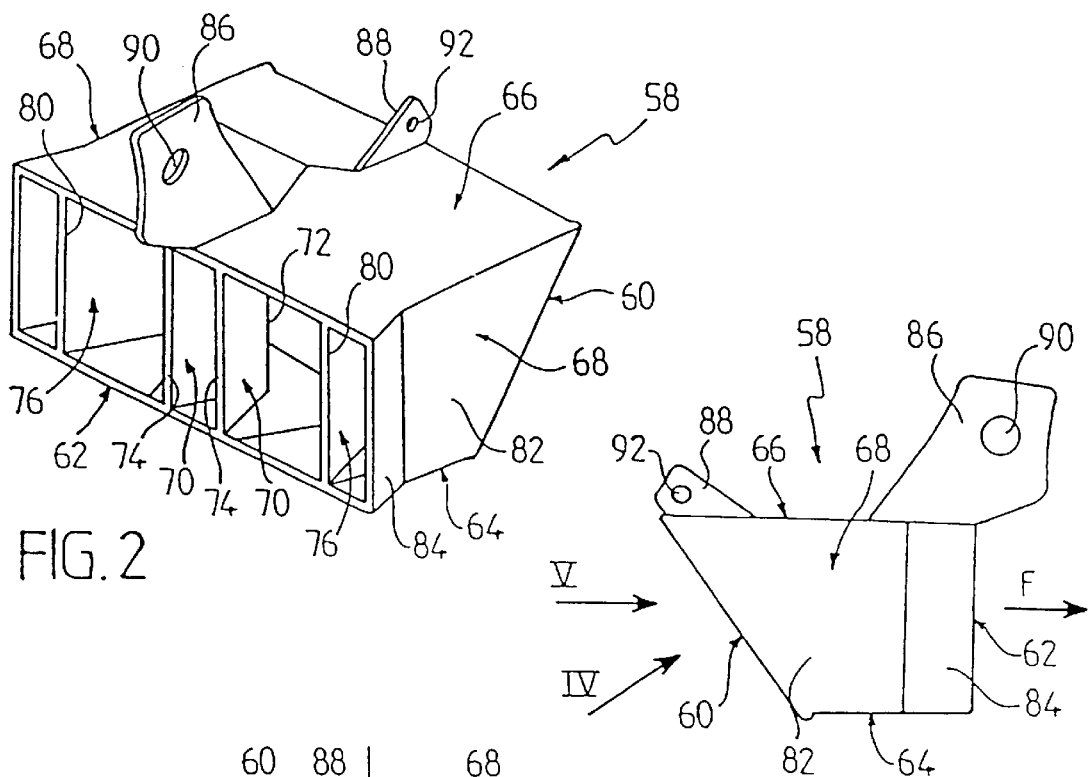
FIG. 2
FIG. 3
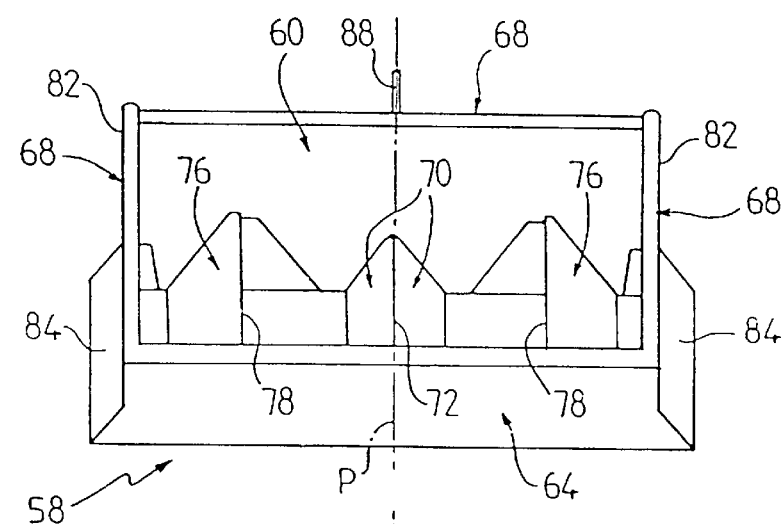
FIG. 4
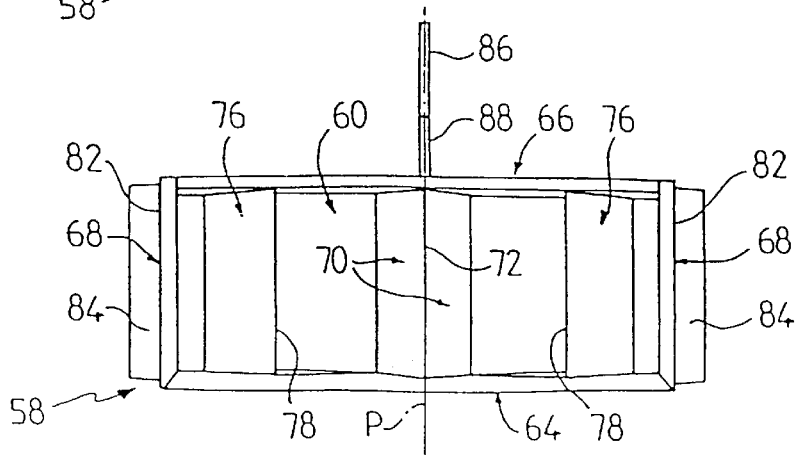
FIG. 5

HEATING AND VENTILATING APPARATUS FOR THE CABIN OF A MOTOR VEHICLE

FIELD OF THE INVENTION

This invention relates to a heating and ventilating apparatus for the cabin of a motor vehicle.

BACKGROUND OF THE INVENTION

More particularly, the invention relates to a heating and ventilating apparatus of the type comprising a casing which defines a fresh air inlet, a mixing zone in communication with a deicing duct, a ventilating duct, and a heating duct, and means for supplying the mixing zone selectively with cold or heated air. The apparatus further includes at least one fresh air passage member having an inlet port which is in communication with the fresh air inlet, and an outlet port which is open into an outlet chamber in communication with the mixing zone, the outlet chamber supplying the ventilating duct and the heating duct.

A heating and ventilating apparatus of this type is known from Applicants' French patent application No. 95 07424.

In addition, in this known device, the fresh air passage member is mounted for pivoting movement in the casing between a first extreme position and a second extreme position, in such a way that the outlet port of the passage member is directed towards a duct selected from the deicing duct, the ventilating duct and the heating duct.

In this known device, the mixing zone receives air at an adjustable temperature, which is then passed towards the above mentioned ducts, that is to say the deicing duct, the ventilating duct and the heating duct.

The deicing duct is arranged to pass a flow of air towards at least one vent directed towards at least one of the glasses of the vehicle, in particular the windshield. The ventilating duct is arranged to direct a flow of air towards the heads of the occupants, through ventilating vents which are provided on the fascia of the vehicle. Finally, the heating duct, otherwise called a "foot heating duct", is arranged to pass a stream of air towards the feet of the occupants, through at least one vent that exhausts into the lower part of the cabin.

In the apparatus which is known from French patent application No. 95 07424, actuating means are arranged to control the pivoting movement of the fresh air passage member between its two extreme positions.

In this way it is possible to direct the stream of fresh air leaving the outlet port of the fresh air passage member selectively, either towards the deicing duct, the ventilating duct, or the heating duct, depending on the aerodynamic and thermal configuration required by the user.

The selected duct is then supplied with a stream of fresh air from the fresh air passage duct, which mixes with the mixed air derived from the mixing zone, and this enables a stream of air at an intermediate temperature to be obtained.

However, it has been found that the fresh air passage member, in accordance, with the above mentioned French patent application has a tendency to channel the fresh air stream, which does not enable optimum mixing of the fresh air stream and the mixed air stream to be obtained.

SUMMARY OF THE INVENTION

A main object of the invention is to overcome this drawback, by encouraging mixing of the fresh air stream from the fresh air passage member with the mixed air stream.

To this end, the invention proposes a heating and ventilating apparatus defined in the introduction hereof, in which the fresh air passage member contains internal deflecting walls which are adapted to modify the flow of a stream of fresh air in the passage member and to encourage mixing of the flow of fresh air with a flow of mixed air at the outlet of the passage member.

Thus, the deflecting walls enable the flow of fresh air to be divided into a plurality of secondary flows which can be separated from each other to a greater or lesser extent, by creating eddies or turbulence that promote mixing of the secondary fresh air streams with the mixed air stream.

In a preferred embodiment of the invention, the fresh air passage member is bound by a lower wall, an upper wall opposite to the lower wall, and two opposed side walls, thereby defining a transverse internal cross section of substantially rectangular form, with the deflecting walls extending between two opposed walls of the passage member.

Preferably, the deflecting walls extend between the lower wall and the upper wall.

The deflecting vanes are preferably in the region of the outlet port of the fresh air passage member.

Preferably, the deflecting walls define an acute angle with the median axis defined by the fresh air passage member. The acute angle is preferably in the range between 10 and 30 degrees.

In a preferred embodiment of the invention, the apparatus includes two central deflecting walls, which are disposed symmetrically with respect to a plane of symmetry of the fresh air passage member, the central deflecting walls being joined in a common edge in the plane of symmetry, being divergent towards the outlet port.

The apparatus preferably further includes at least one pair of intermediate deflecting walls which are disposed symmetrically with respect to the plane of symmetry, and each of which is located between one central deflecting wall and one side wall of the box.

The side walls of the box preferably include terminal portions which are divergent in the direction towards the outlet port of the fresh air passage member.

In the invention, the fresh air passage member is preferably made in the form of a box open at both ends, this box being provided with an external first lug adapted for a pivot axis to pass through it for pivoting movement of the box.

Preferably, the passage member is provided with an external second lug adapted to be coupled to actuating means for controlling the pivoting movement of the fresh air passage member between its two extreme positions.

The external first lug and the external second lug preferably project from a common wall of the fresh air passage member, for example the upper wall.

In a preferred embodiment of the invention, the fresh air passage member is mounted for pivoting movement in the casing between a first extreme position and a second extreme position, in such a way that the outlet port of the passage member is directed towards a duct selected from the deicing duct, the ventilating duct and the heating duct.

However, the invention is equally applicable to the case in which the fresh air passage member is fixed within the casing.

In the following description, which is given by way of example only, reference is made to the attached drawings, in which:

BRIEF DESCRIPTION OF THE DRAWINGS

FIG. 2 is a perspective view of the fresh air passage member in the apparatus of FIG. 1;

FIG. 3 is a side view of the fresh air passage member;

FIG. 4 is a view of the fresh air passage member, seen in the direction of the arrow IV in FIG. 3;.

FIG. 5 is a view of the fresh air passage member, seen in the direction of the arrow V in FIG. 3;

DESCRIPTION OF THE PREFERRED EMBODIMENTS

Figure 1:
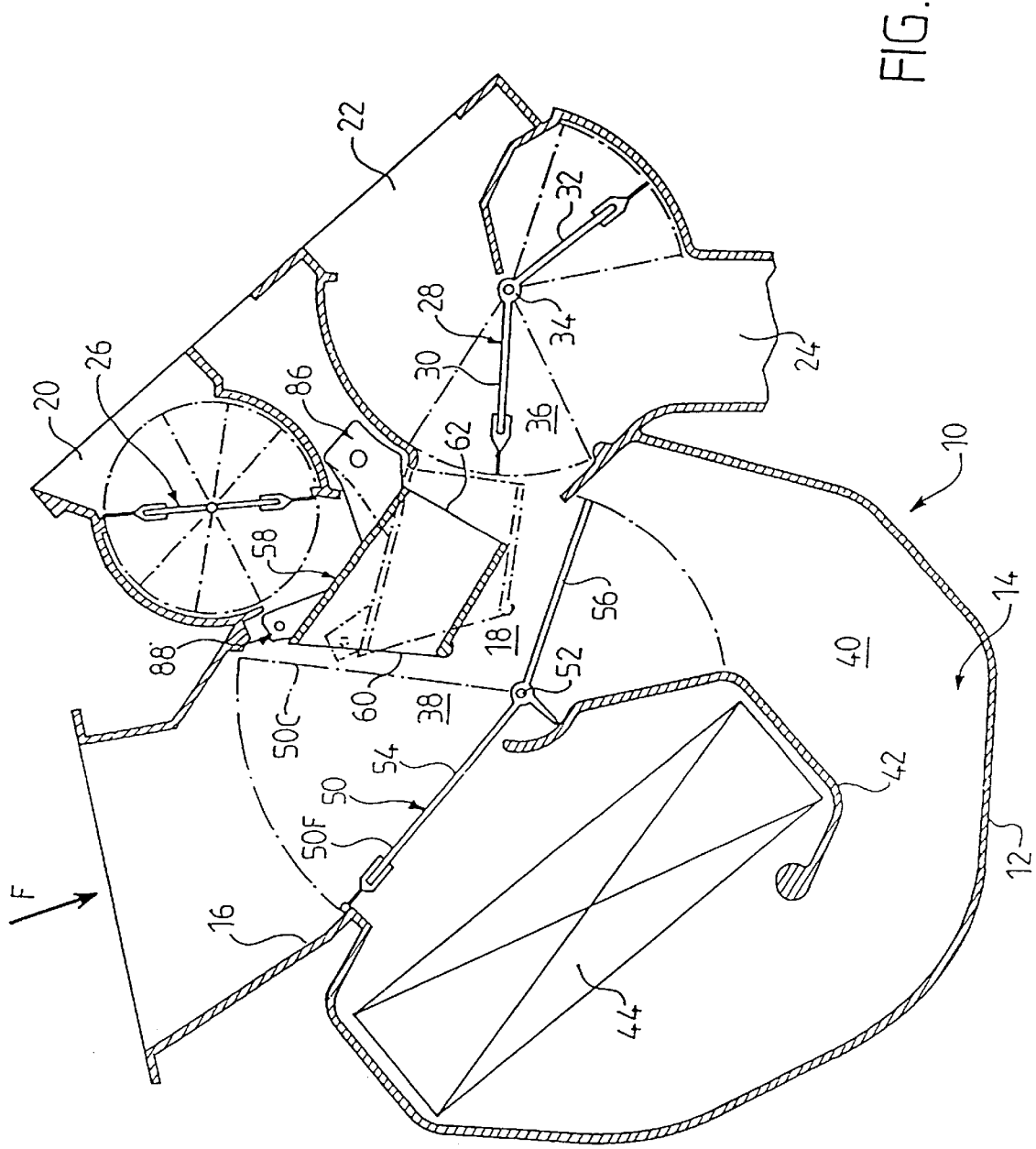
FIG. 1 is a view in transverse cross section of a heating and ventilating apparatus in accordance with the invention.
Figure 6:
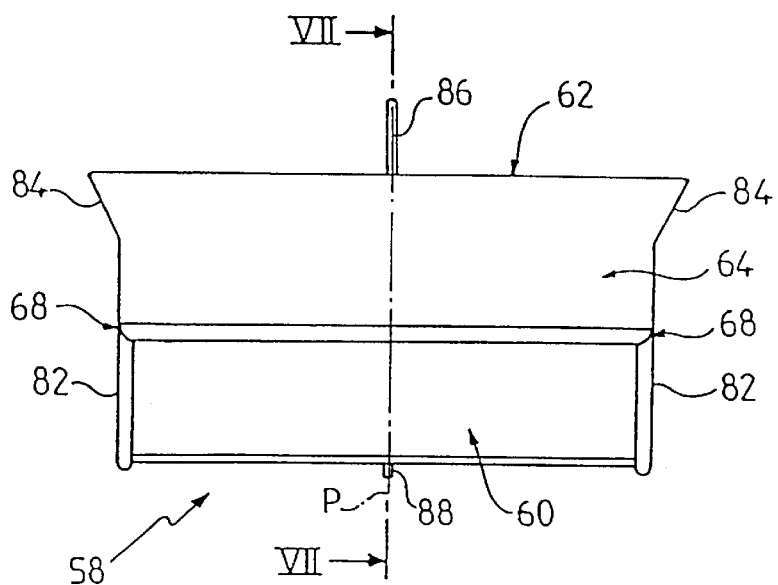
FIG. 6 is a bottom plan view of the fresh air passage member of FIG. 2.

The heating and ventilating apparatus in FIG. 1 comprises a casing 10 which is bound mainly by a wall 12, the generatrices of which are parallel to each other and lie at right angles to the plane of the leaf, and also by two side walls 14 (only one of which can be seen in FIG. 1). A fresh air inlet 16 is defined in the casing so as receive (in the direction of the arrow F) a stream of blown air, which may be conditioned and which is either drawn from outside the cabin of the vehicle or recirculated from the latter.

The casing 10 also defines a mixing chamber 18 which is in communication with a deicing duct 20, a ventilating duct 22 and a heating duct 24.

The deicing duct 20 is controlled by a pivoting flap valve 26, and is adapted to deliver fresh or heated air towards at least one vent (not shown) which is situated close to a glass of the vehicle, especially the windshield.

The ventilating duct 22 is adapted to deliver a stream of fresh or heated air towards at least one ventilator (not shown), which is situated in particular on the fascia of the vehicle.

The heating duct 24 (also referred to as a "foot-heating duct") is adapted to deliver a stream of fresh or heated air towards at least one ventilator (not shown) which is situated in the lower part of the cabin, so as to direct this air towards the feet of the occupants.

The ducts 22 and 24 are controlled by a common regulating flap valve 28 which comprises two parts 30 and 32, connected to a pivot spindle 34 and defining between them an angle of about 120 degrees. The flap valve 28 is adapted to be displaced within a generally cylindrical chamber 36, which is in communication with the mixing zone 18 and which is arranged to feed the ducts 22 and 24.

The apparatus 10 further delimits a fresh air transmission branch 38, which is interposed between the fresh air inlet 16 and the mixing zone 18, together with an air heating branch 40 which is substantially U-shaped, and which communicates firstly with the air inlet 16 and secondly with the mixing zone 18.

The U-shaped form of the branch 40 is defined by a portion of the wall 12 and by an internal wall 42. Contained in the air heating branch 40 is a heat exchanger 44 having two tubes (not shown) which serve for the emission and evacuation, respectively, of a hot fluid, which is preferably the coolant fluid for the engine of the vehicle.

Arranged at the junction between the two branches 38 and 40 is a mixing flap valve 50 which is mounted for pivoting movement about a pivot spindle 52, and which consists of two parts 54 and 56, which lie on either side of this pivot spindle.

The flap valve 50 is able to assume a first end position 50C, or "hot position" (which is indicated in a phantom line), in which the whole of the stream of air passes through the air heating chamber 40 and therefore through the heat exchanger 44, in which it is heated. It is also able to assume a second position 50F, or "cold position" (which is indicated in full lines), in which the whole of the stream of air passes through the fresh air transmission branch 38 without passing through the heat exchanger 44.

The mixing valve 50 is also able to assume any intermediate position between the positions 50C and 50F, so as to distribute the stream of air between the two branches and thus to regulate the temperature of the air which is passed to the mixing zone 18 and which is subsequently distributed between the ducts 20, 22 and 24.

The flap valve 26 is shown in a closed position in which the valve 28 is represented in a so-called "foot-ventilating" position, in which the stream of air coming from the mixing zone 18 enters the chamber 36 and is divided into two streams, namely a stream directed towards the ventilating duct 22 and a stream directed towards the heating duct 24.

FIG. 1 also shows, in phantom lines, two further positions of the flap valve 28, namely a "ventilating" position in which all of the stream of air is directed towards the ventilating duct 22, and a "feet" position in which the whole of the stream of air is directed towards the heating duct 24.

The apparatus also includes a fresh air passage member 58, which is mounted within the casing 10 and which has an inlet port 60 communicating with the fresh air inlet 16, together with an outlet port 62 which is open towards the outlet chamber 34 that supplies the ducts 22 and 24.

The fresh air passage member 58 is mounted for pivoting movement within the casing 10. The inlet port 60 of the passage member 58 lies close to the inlet 16, in the zone of evolution of the mixing valve 50, in such a way as to be closed when the mixing valve is in the position 50C. The passage member is pivotable between two end positions, in such a way that its outlet port 62 is directed towards a duct which is selected among the deicing duct 20, the ventilating duct 22 and the heating duct 24.

The structure of the apparatus described above is disclosed, from French patent application No. 95 07424 cited above.

The invention is directing at improving the structure of the passage member 58, in order to improve the mixing of the fresh air stream that emerges from the passage member, with a stream of mixed air.

The fresh air passage member 58 (FIGS. 2 to 5) is bound by a lower wall 64, an upper wall 66 opposite to the wall 64, and two opposed side walls 68, SO as to define an internal transverse cross section which is substantially rectangular in form. The passage member 58 is thus in the form of a box open at both ends, through the ports 60 and 62.

The lower wall 64 and the upper wall 66 are substantially parallel to each other. In particular, as can be seen in FIGS. 2 and 3, the inlet port 60 lies obliquely with respect to the walls 64 and 66, while the outlet port 62 extends in a direction which is generally at right angles to the walls 64 and 66.

The passage member 58 has a plane of symmetry P (FIGS. 4, 5, 6 and 8) which lies halfway between the side walls 68 and extends parallel to the direction F in which the stream of air flows in the passage member 58.

The passage member 58 contains internal deflector walls which are adapted to modify the flow of the stream of air F.

These guide vanes comprise, first of all, two central deflecting walls 70 (FIGS. 2, 4, 5 and 8) which extend between the lower wall 64 and the upper wall 66. These deflecting walls 70 are disposed symmetrically with respect to the plane of symmetry P of the passage member 58. They are joined in a common edge 72 which lies spaced away from the inlet port 60, and each of them terminates in an edge 74 which lies in the plane defined by the outlet port 62. Each of the central deflecting walls 70 defines an acute angle with respect to the median axis (i.e. the plane of symmetry P) which is defined by the passage member 58 (see FIG. 8). This angle is in the range between 10 and 30 degrees, and in this example it is about 25 degrees.

The passage member 58 further contains two intermediate deflecting walls 76, which are disposed symmetrically with respect to the plane P, with each of them being located between one central deflecting wall 70 and one side wall 68 of the box.

Figure 8:
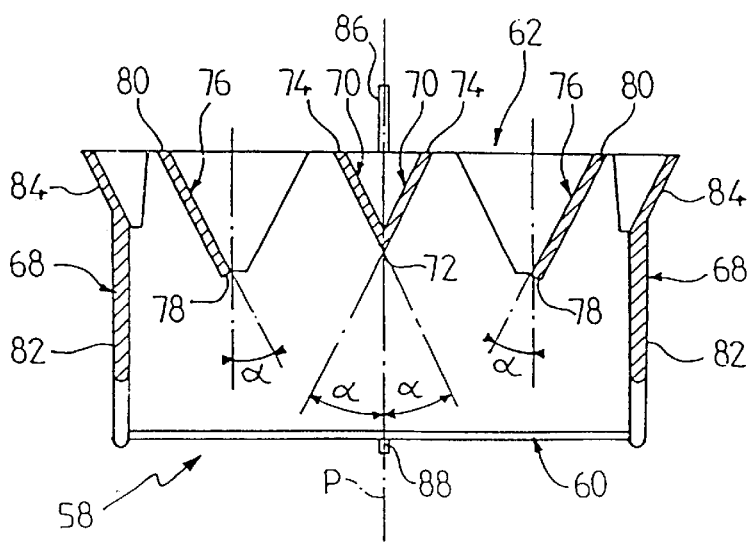
FIG. 8 is a view in cross section taken on the line VIII—VIII in FIG. 7.

Each of the deflecting walls 76 again defines an angle with the median axis of the passage member, and therefore extends in a direction which is substantially parallel to the adjacent guide vane 70 which is adjacent to it (FIG. 8).

Each of the intermediate deflecting walls 76 has a first edge 78 spaced away from the inlet face 60, and a second edge 80 which is situated in the plane of the outlet port 62.

In addition, each of the side walls 68 comprises a first portion 82 which extends from the inlet face 60 in a direction parallel to the median plane P, and which is followed by a diverging terminal second portion 84 (FIGS. 2–6, 8). The terminal portions 84 diverge away from each other in the direction towards the outlet port 62 of the passage member. Each of the terminal portions 84 is substantially parallel to the intermediate deflecting wall 76 that is adjacent to it.

The deflecting walls 70 and 76, together with the divergent portions 84 of the passage member 58, divide the stream of fresh air F into two divergent secondary flows, which leads to the creation of vortices or eddies which encourage the stream of fresh air to mix with the mixture of the stream of mixed air.

Figure 7:
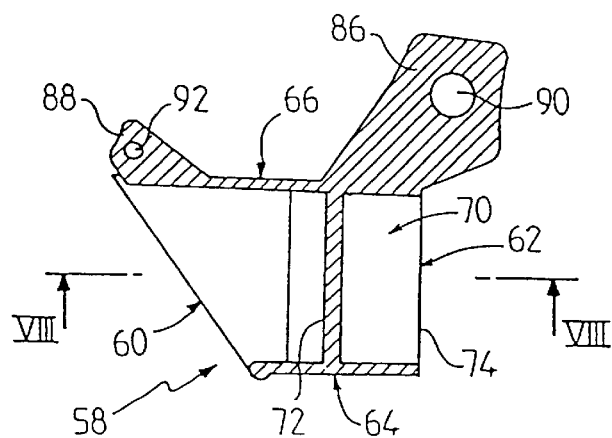
FIG. 7 is a view in cross section taken on the line VII—VII in FIG. 6.

Projecting from the upper wall 66 of the passage member 58 is a first lug 86 (FIGS. 2, 3,) which has a hole 90 (FIGS. 2, 3 and 7) for cooperating with an appropriate spindle (not shown) so as to enable the passage member 58 to pivot within the casing 10 between its two end positions.

Also projecting from the upper wall 66 is a further lug 88 (FIGS. 2, 3, 5–8), formed with a hole 92 and adapted to be connected to actuating means (not shown) for controlling the pivoting movement of the passage member 58 between its two extreme positions.

The passage member 58 is thus enabled to pivot between a first extreme position (shown in full lines in FIG. 1), in which the outlet port 62 is directed towards the ventilating duct 22, and a second extreme position (shown in phantom lines in FIG. 1), in which the outlet port 62 is directed towards the heating duct 24.

The amplitude of the pivoting movement of the passage member 58 is of the order of 15 to 20 degrees. Normally, the passage member may be only placed in one or other of the two extreme positions, although it is also within the scope of the invention to provide a modified version in which the passage member is able to assume at least one intermediate position.

The actuating means for the passage member are operable so as to cause the passage member to pivot only when the flap valve 28 is in its "foot-ventilating" position as indicated in full lines in FIG. 1. In this position, the ventilating duct 22 and the heating duct 24 are both supplied with mixed air at the same time. It is then possible to direct the outlet port of the passage member 58, either towards the ventilating duct 22 or towards the heating duct 24. In the first case, the ventilators receive air at a lower temperature than the foot-heating outlet vents. In the second case, the opposite situation obtains.

The actuating means coupled to the fresh air passage member 58 are arranged to operate to cause the passage member to pivot when the deicing valve 26 is in a closed position as shown in FIG. 1.

By contrast, when the deicing valve 26 opens up the deicing duct 20, the fresh air passage member 58 is unable to pivot and therefore remains blocked in its first end position, that is to say the position in which the outlet port 62 is directed towards the ventilating duct 22.

The invention is not limited to the embodiment described above by way of example, and is amenable to numerous modifications, especially as regards the structure and number of the deflecting walls provided in the fresh air passage member.

In addition, the fresh air passage member may be mounted in a fixed position within the casing.

We claim:

1. A heating and ventilating apparatus for the cabin of a motor vehicle, comprising a casing defining a fresh air inlet;

a mixing zone in communication with a deicing duct, a ventilating duct, and a heating duct;

means for selectively supplying the mixing zone with cold or heated air;

at least one fresh air passage member having an inlet port for communicating with the fresh air inlet, and an outlet port including an outlet chamber for communicating with the mixing zone, said outlet chamber supplying the ventilating duct and the heating duct, wherein the fresh air passage member contains a plurality of internal deflecting walls for modifying the flow of a stream of fresh air in said passage member and for mixing said flow of fresh air with a flow of mixed air at outlet of the said passage member.

2. Apparatus according to claim 1, wherein the fresh air passage member is bound by a lower wall, an upper wall opposite to the lower wall, and two opposed side walls, said lower, upper and opposed side walls defining a transverse internal cross section of substantially rectangular form, and the deflecting walls extending between two opposed walls the upper and lower walls of said passage member.

3. Apparatus according to claim 2, wherein the deflecting walls extend between the lower wall and the upper wall.

4. Apparatus according to claim 1, wherein the deflecting walls are in a region of the outlet port of the fresh air passage member.

5. Apparatus according to claim 1, wherein the deflecting walls define an acute angle ($\alpha$) with a median axis defined by the fresh air passage member.

6. Apparatus according to claim 5, wherein the acute angle ($\alpha$) is in the range between 10 and 30 degrees.

7. Apparatus according to claim 1, wherein said internal walls include two central deflecting walls disposed symmetrically with respect to a plane of symmetry of the fresh air passage member, said central deflective walls being joined in a common edge in the plane of symmetry and diverging towards the outlet port.

8. Apparatus according to claim 1, wherein said internal walls comprise at least one pair of intermediate deflecting walls disposed symmetrically with respect to a plan of symmetry, each of said intermediate deflecting walls being located between a central deflecting wall and a side wall of the fresh passage member.

9. Apparatus according to claim 1, wherein a plurality of side walls of the fresh passage member have terminal portions diverging towards the outlet port of the passage member.

10. Apparatus according to claim 1, wherein the fresh passage member is in the form of a box open at both ends having an external first lug for pivoting the box.

11. Apparatus according to one of claim 10, wherein the fresh passage member is provided with an external second lug coupled to actuating means for controlling the pivoting movement of the fresh air passage member between its two extreme positions.

12. Apparatus according to claim 11, wherein the external first lug and the external second lug project from a common wall of the fresh air passage member.

13. Apparatus according to claim 1, wherein the fresh air passage member is mounted in the casing for movement between a first extreme position and a second extreme position, such that the outlet port of the passage member is directed towards a duct selected from the deicing duct, the ventilating duct and the heating duct.

14. Apparatus according to claim 3, wherein the deflecting walls are in a region of the outlet port of the fresh air passage.

15. Apparatus according claim 3, wherein the deflecting walls define an acute angle (α) with a median axis defined by the fresh air passage member.

16. Apparatus according to claim 15, wherein the acute angle (α) is in the range between 10 and 30 degrees.

17. Apparatus according to claim 16, wherein said internal walls include two central deflecting walls disposed symmetrically with respect to a plane of symmetry of the fresh air passage member, said central deflecting walls being joined in a common edge in the plane of symmetry and diverging towards the outlet port.

18. Apparatus according to claim 17, wherein said internal walls comprise at least one pair of intermediate deflecting walls disposed symmetrically with respect to a plan of symmetry, each of said intermediate deflecting walls being located between a central deflecting wall and a side wall of the fresh passage member.

19. Apparatus according to claim 18, wherein a plurality of side walls of the fresh passage member have terminal portions diverging towards the outlet port of the passage member.

20. Apparatus according to claim 19, wherein the fresh passage member is in the form of a box open at both ends having an external first lug for pivoting the box.

21. Apparatus according to claim 20, wherein the fresh passage member is provided with an external second lug coupled to actuating mean for controlling the pivoting movement of the fresh air passage member between its two extreme positions.

22. Apparatus according to claim 21, wherein the external first lug and the external second lug project from a common wall of the fresh air passage member.

23. Apparatus according to claim 22, wherein the fresh air passage member is pivotally mounted in the casing for movement between a first extreme position and a second extreme position, such that the outlet port of the passage member is directed towards a duct selected from the deicing duct, the ventilating duct and the heating duct.

* * * * *